April 28, 1931.  S. BLOOMENTHAL  1,802,699

LIGHT VALVE

Filed Dec. 12, 1929

INVENTOR
SIDNEY BLOOMENTHAL
BY
ATTORNEY

Patented Apr. 28, 1931

1,802,699

UNITED STATES PATENT OFFICE

SIDNEY BLOOMENTHAL, OF NEW YORK, N. Y., ASSIGNOR TO RADIO CORPORATION OF AMERICA, A CORPORATION OF DELAWARE

LIGHT VALVE

Application filed December 12, 1929. Serial No. 413,452.

The present invention relates to Kerr cells, and in particular to a method and means for maintaining a bias thereon so as to permanently decrease the conductivity of the solution contained within the cell during periods when electric potentials are applied thereto.

In accordance with the teachings of Karolus, it has heretofore been known in the art that it is possible to maintain an electrical bias on Kerr cells and the like so as to apply a biasing potential to the dielectric material contained within the cell and thus decrease its conductivity during time periods when electric potentials are applied to the cell electrodes so as to electrically doubly refract polarized light beams passing therethrough from a polarizer.

However, it has been found that it is materially easier to produce a strong magnetic field than an electric field, and it is, therefore, an object of my invention to provide a method and means by which a Kerr cell or similar type of light valve may be biased magnetically during time periods when electric potentials are applied thereto.

In the past, when using the Kerr cell in television, for example, it was customary to employ a static electric field of sufficient strength to introduce a path difference of a quarter wave length between the two waves traversing the cell, one having its light vibrations along the direction of the field and the other having its vibrations perpendicular to the field, thereby furnishing a steady light intensity value. The alternating voltages then superimposed upon the cell cause an increase and decrease of this phase difference when applied to the cell plates, and thus produce the changing electric double refraction of the light beams passing through the cell so that the modulated light from the analyzer may be used to either record messages photographically or to actuate audible recorders through the use of photoelectric cells and associated amplifiers controlling such recorders, for example.

Figure 1:
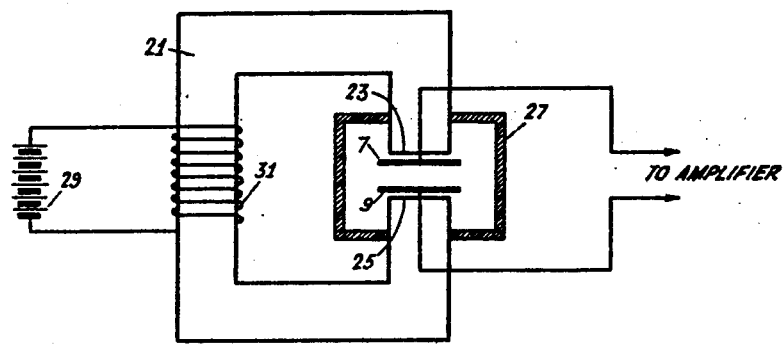
Figure 2:
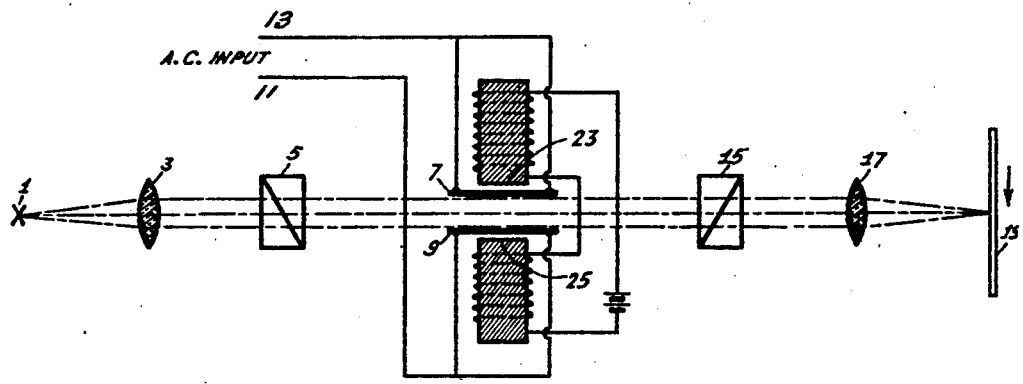

In accordance with my invention, as illustrated by the accompanying drawings, wherein Fig. 1 illustrates a section through a Kerr cell, so as to diagrammatically illustrate a preferred embodiment of an electromagnetic biasing system for the cell, and wherein Fig. 2 conventionally illustrates the optical arrangement of the cell with the magnetic bias also conventionally illustrated, I have provided a method and means whereby it is possible to utilize a stationary magnetic field of appropriate strength to introduce a path difference of a quarter wave length between the two waves having vibrations parallel and perpendicular to the magnetic field respectively.

In accordance with the showing of the drawing, and first referring to Fig. 2 thereof, light issuing from a source 1, which may be an arc, glass lamp, incandescent lamp source, or the like, is passed through a lens system 3 and a polarizer 5 to pass between the electrodes 7 and 9 of the Kerr cell containing an appropriate liquid such as nitrobenzene, for example, and controlled in accordance with signal potentials applied to the electrodes 7 and 9 through conductors 11 and 13 respectively, which are connected with any appropriate form of amplifying system, not shown. As light, controlled by means of the applied potentials acting upon liquid contained within the cell, leaves the cell it passes through an analyzer 15 and a lens system 17 and is directed to a film strip 19, for example, so as to optically record by photographic means, for example, the message corresponding to the electric potentials applied to the electrodes through means of the conductors 11 and 13 connected with the amplifier.

For producing the magnetic field as a bias medium for the cell, I have provided, as shown more particularly by Fig. 1, a magnet 21, having its poles 23 and 25 immersed within the liquid contained within the cell proper, generally designated 27, and have applied thereto a direct current from any appropriate source, such as is conventionally shown by the battery 29 through the winding 31. However, the bias may be produced by a strong magnetic as well as electromagnetic field.

In accordance with the showing of Fig. 1, it is observed that light supplied to the Kerr cell is applied in a direction as shown by the drawing looking downwardly so that it is at right angles to the direction of the magnetic field. Thus, while electric signal potentials are applied to the cell through the conductors 11 and 13, the cell is at all times magnetically biased in such a manner as to have the conductivity of the liquid materially decreased, or, in other words, the resistance thereof materially increased, and, in addition, to permit a steady component of light intensity which is modulated by the varying electrical potentials.

While for purposes of illustration I have suggested that the cell may contain nitrobenzene as the liquid rendered doubly refractive upon the application of electric signal potentials to the plates of the cell, it is also possible to substitute for nitrobenzene other liquids which are rendered more or less doubly refractive upon the application of an electric field, and such liquids may, for example, include carbondisulphide, aniline, toluol, xylol, cumol, chloroform, methylalcohol, amylchloride, iodobenzol, etc., and my invention is applicable to all types of solutions in combination with the Kerr cell.

In accordance with my invention, it is also possible to vary the type of magnetic field applied, and I, therefore, believe that my disclosure and claims should be interpreted in a generic and not in a limiting sense, and that I should be entitled to make any and all modifications such as fall fairly within the spirit and scope of the invention, as defined by the hereinafter appended claims.

Having now described my invention, what I claim and desire to secure by Letters Patent is the following:

1. The method of controlling a polarized beam of light by electric current impulses by means of a Kerr cell which consists in directing the light beam between the electrodes of the cell, in supplying current impulses to the cell electrodes for producing electric double refraction of the light beam passing therethrough, and in simultaneously applying to the cell electrodes a magnetic bias for decreasing the conductivity of the doubly refractive solution contained within the cell, and for providing a steady value of the light intensity to be modulated in accordance with these impulses.

2. A system for controlling a polarized beam of light by means of relatively low potential electric current impulses which comprises a Kerr cell having electrodes and a connection therefrom to the source of current impulses, means for passing said light beam between the electrodes of said cell, and means for applying a magnetic biasing potential to the cell during periods when electric potentials are supplied thereto.

3. A Kerr cell having a pair of electrodes and a transparent liquid medium contained in said cell and adapted in the presence of an electrostatic field between the electrodes to produce electric double refraction of a light ray passing through the cell, and magnetic biasing means for decreasing the electric conductivity of the liquid contained within the cell during periods when signals are applied thereto as changes in the strength of the electrostatic field.

4. In a light control system, a Kerr cell having a pair of electrode elements and an electro-optically responsive liquid dielectric material contained therebetween, means for passing a polarized light beam through said liquid and between the electrodes of said cell, means for applying electric potentials to the electrodes of said cell for producing electric double refraction of the plane polarized beam of light passing therethrough, and means for permanently connecting a magnetic field with said cell in such manner that the field produced is at right angles to the light beams passing therethrough for permanently biasing said cell during periods when said electric potentials are applied thereto.

SIDNEY BLOOMENTHAL.